GEORGE DAVIS, OF ELIZABETHPORT, NEW JERSEY.

Letters Patent No. 85,797, dated January 12, 1869.

IMPROVEMENT IN THE METHOD OF TEMPERING STEEL.

The Schedule referred to in these Letters Patent and making part of the same.

*To all whom it may concern:*

Be it known that I, GEORGE DAVIS, of Elizabethport, in the county of Union, and State of New Jersey, have invented a new and useful Improvement in the Method of Tempering Steel; and I do hereby declare that the following is a full, clear, and exact description thereof, which will enable others skilled in the art to make and use the same.

This invention relates to a new manner of tempering already completed steel or other tools and articles, and consists of a mixture of sand and water, which mixture is placed in a barrel or other suitable receptacle, the object being to regulate the degree of temper by the amount of water with which the iron is brought in contact.

The sand and water are mixed in such proportions that the required temper may be produced. For instance, to make a strong carriage-spring of one-eighth inch iron, the proportions would be four pounds of moulding-sand to one quart of water; for one-fourth inch iron, three pounds of sand to one quart of water; and for three-eighth inch iron, two pounds of sand to one quart of water, and so on in the same ratio.

The tool is heated to a red heat, and is then immersed in the mixture. Its heat absorbs the water, until all the surrounding water is absorbed, when the surrounding dry sand prevents the further tempering of the tool, as it prevents moisture from the mixture or from the atmosphere from reaching the steel. The quantity of water, therefore, which is mixed with the sand, regulates the temper of the steel, and the latter can consequently be tempered to any desired degree.

It will be understood that this invention does not at all relate to the manufacture of iron or steel, nor to the tempering of steel during the manufacture of the same, but only to the tempering of already-finished tools or articles.

Having thus described my invention,

I claim as new, and desire to secure by Letters Patent—

Tempering finished tools in a mixture of sand and water, by the herein-described process.

GEORGE DAVIS.

Witnesses:
JOSEPH ALWARD,
JOHN R. HOOVER.